March 19, 1935.  F. HOLMES ET AL  1,994,951

SAUSAGE STUFFING AND LINKING MACHINE

Filed Nov. 23, 1932  8 Sheets-Sheet 1

Inventors.
Frank Holmes and Albert Balkema,
By their Attorney

March 19, 1935.  F. HOLMES ET AL  1,994,951
SAUSAGE STUFFING AND LINKING MACHINE
Filed Nov. 23, 1932   8 Sheets-Sheet 2
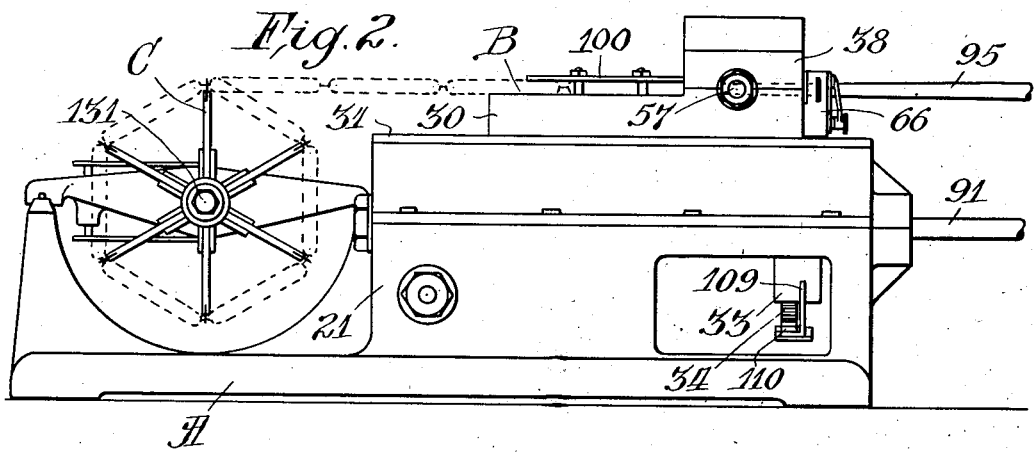
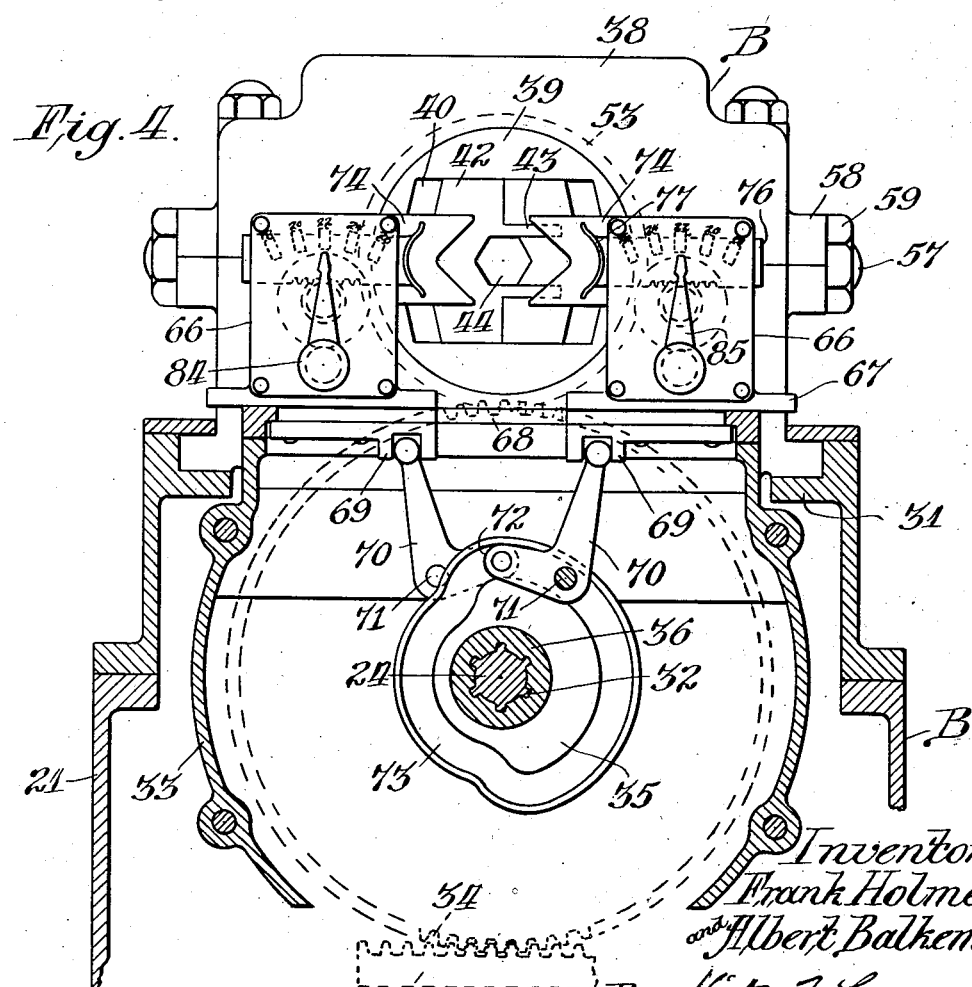
Inventors,
Frank Holmes
and Albert Balkema,
By Victor F. Lanuegue
Atty.

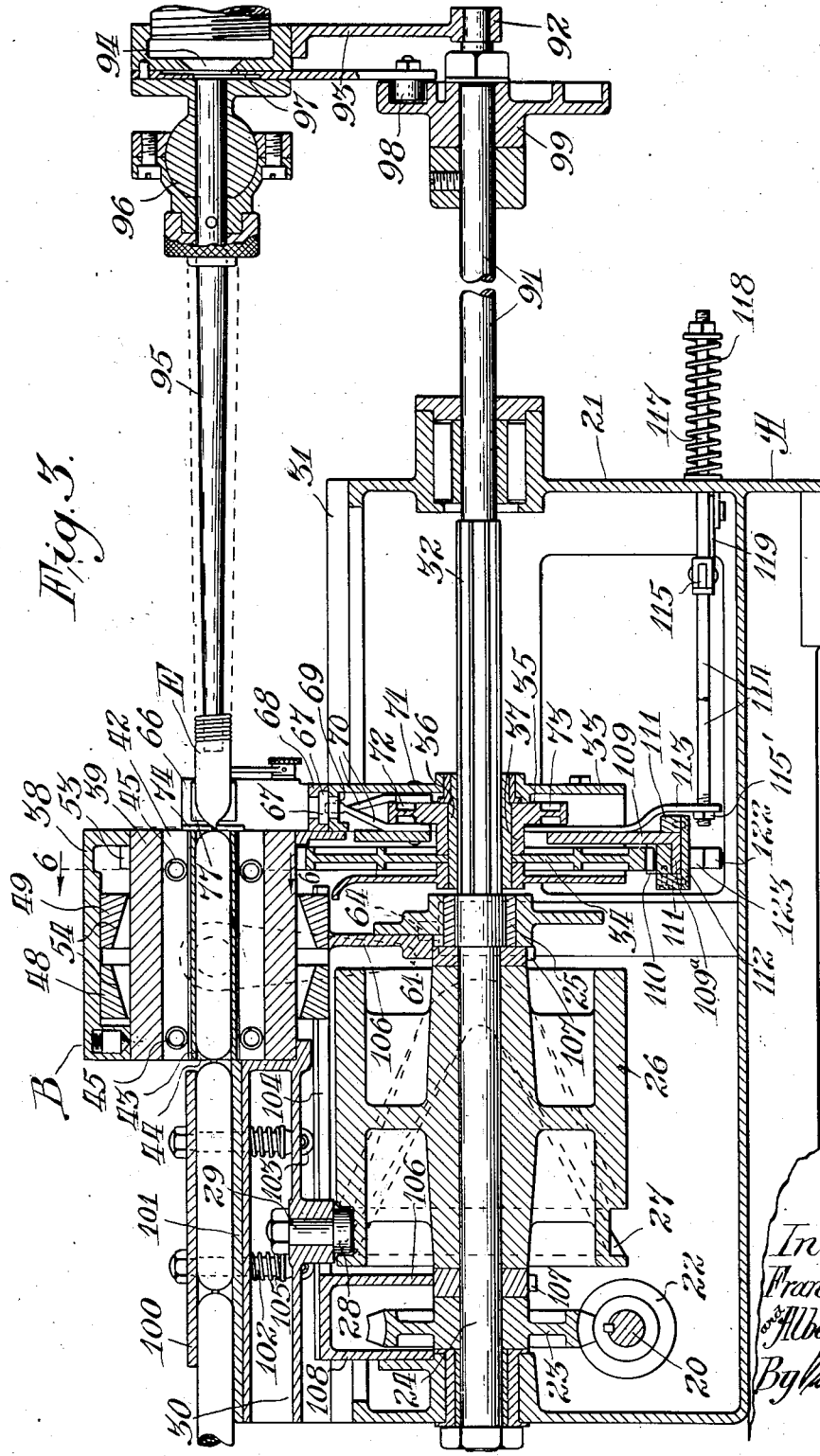

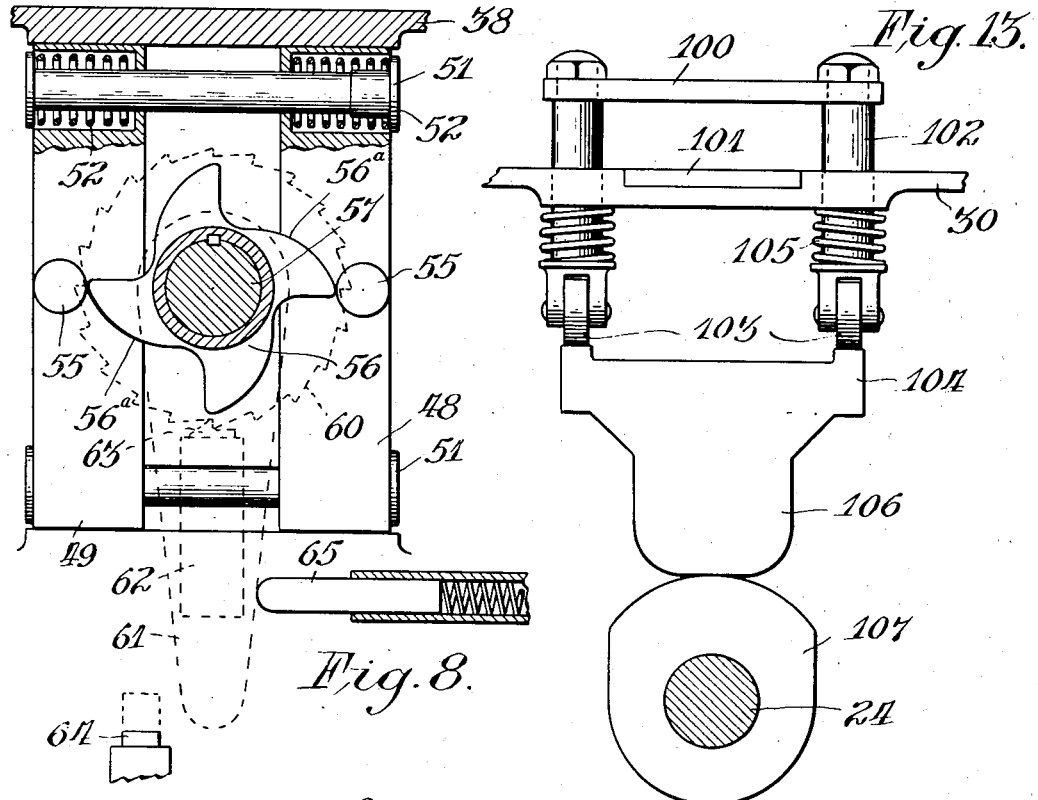
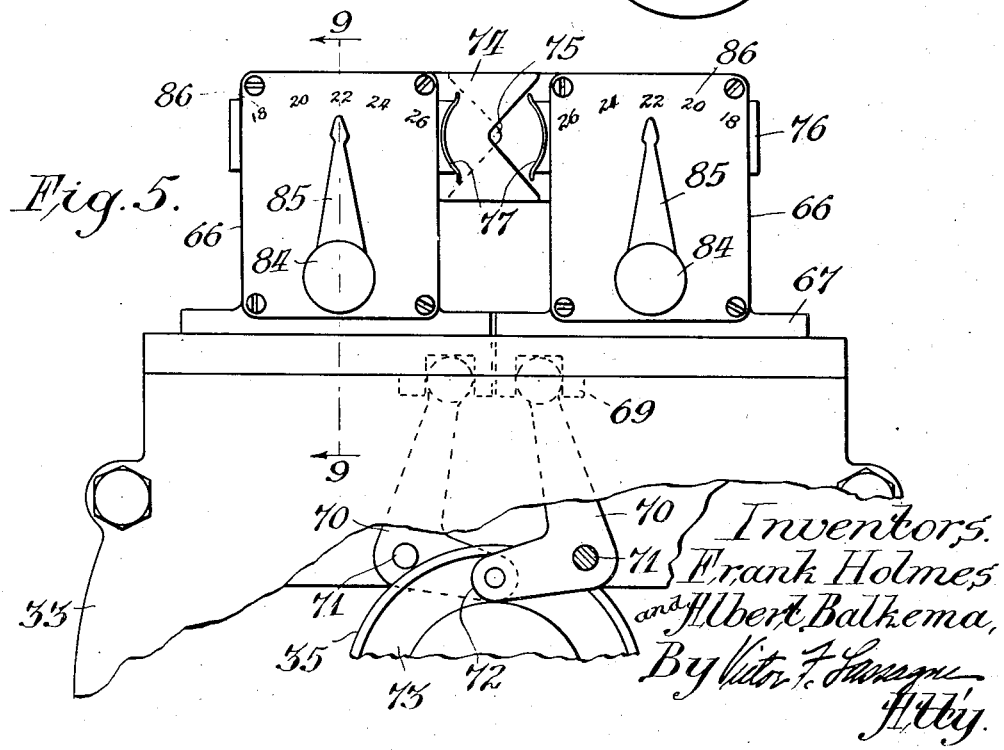

March 19, 1935. F. HOLMES ET AL 1,994,951
SAUSAGE STUFFING AND LINKING MACHINE
Filed Nov. 23, 1932 8 Sheets-Sheet 5

Inventors
Frank Holmes and Albert Balkema,
By Victor F. [illegible], Atty.

March 19, 1935. F. HOLMES ET AL 1,994,951
SAUSAGE STUFFING AND LINKING MACHINE
Filed Nov. 23, 1932  8 Sheets-Sheet 6
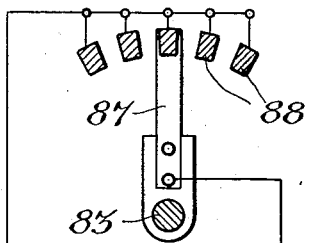
Fig. 11.
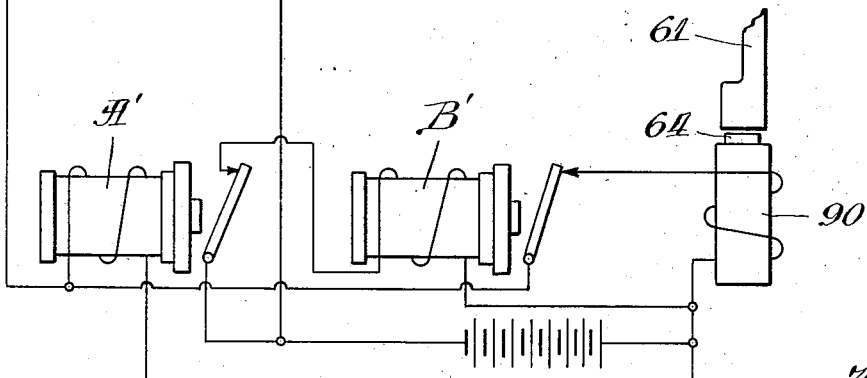
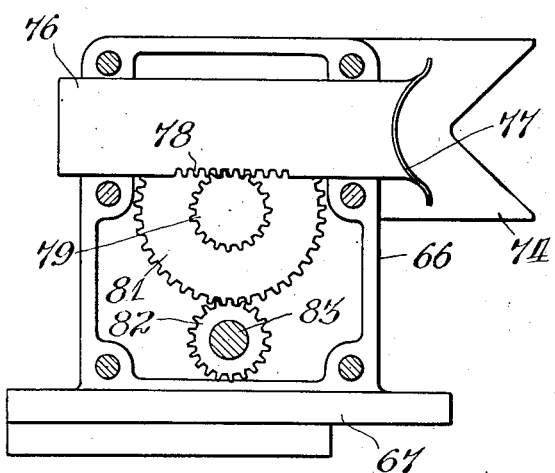
Fig. 10.
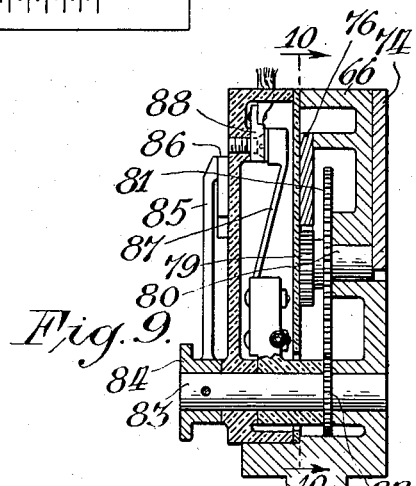
Fig. 9.
Inventors,
Frank Holmes
and Albert Balkema,
By Victor J. Lasuque
Atty.

March 19, 1935.  F. HOLMES ET AL  1,994,951
SAUSAGE STUFFING AND LINKING MACHINE
Filed Nov. 23, 1932  8 Sheets-Sheet 7
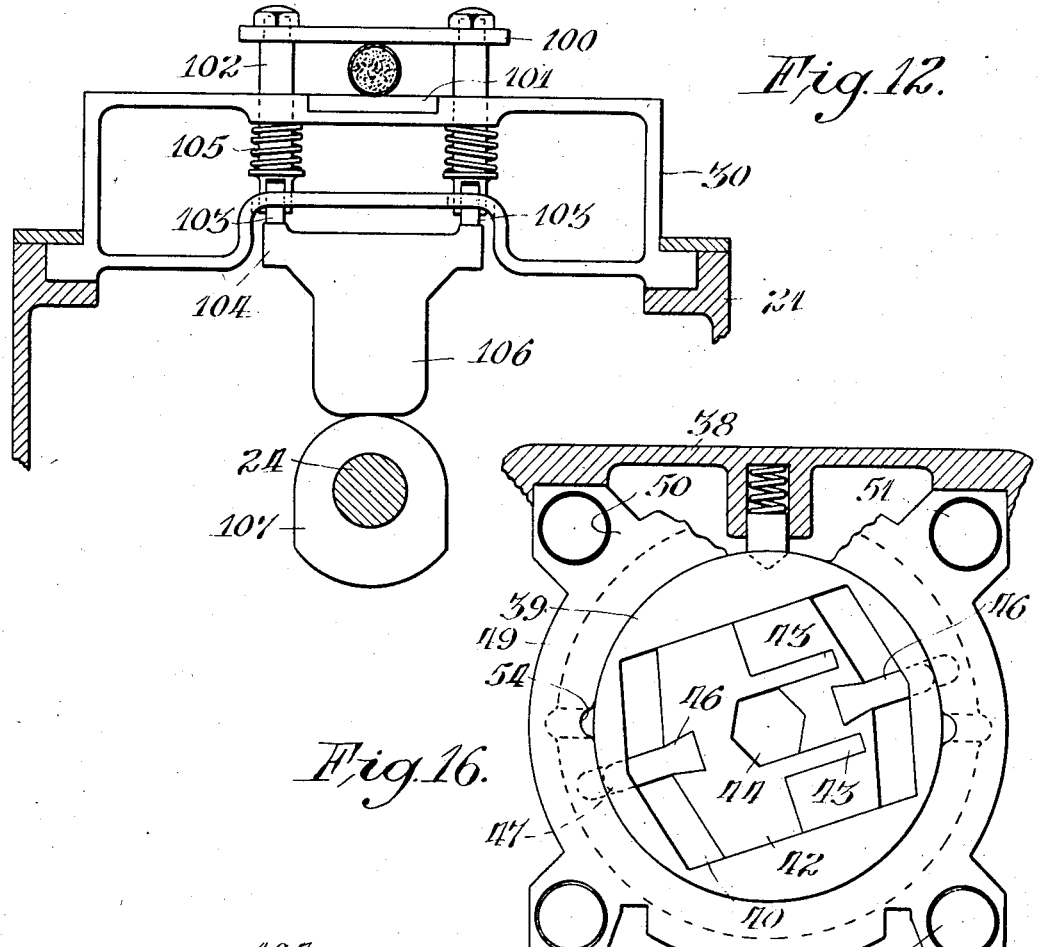
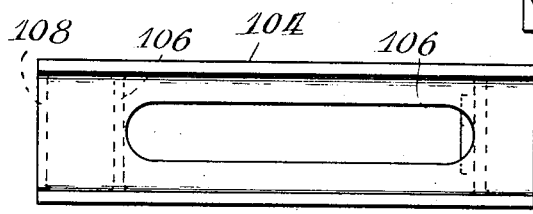
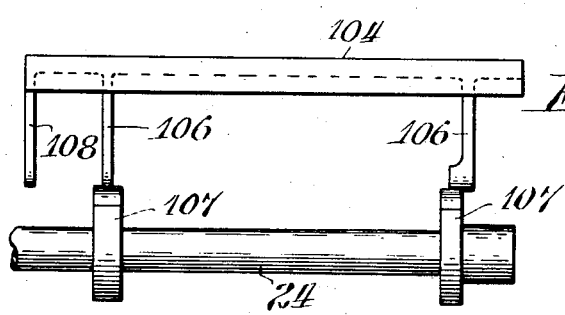
Inventors
Frank Holmes
and Albert Balkema,
By
Atty.

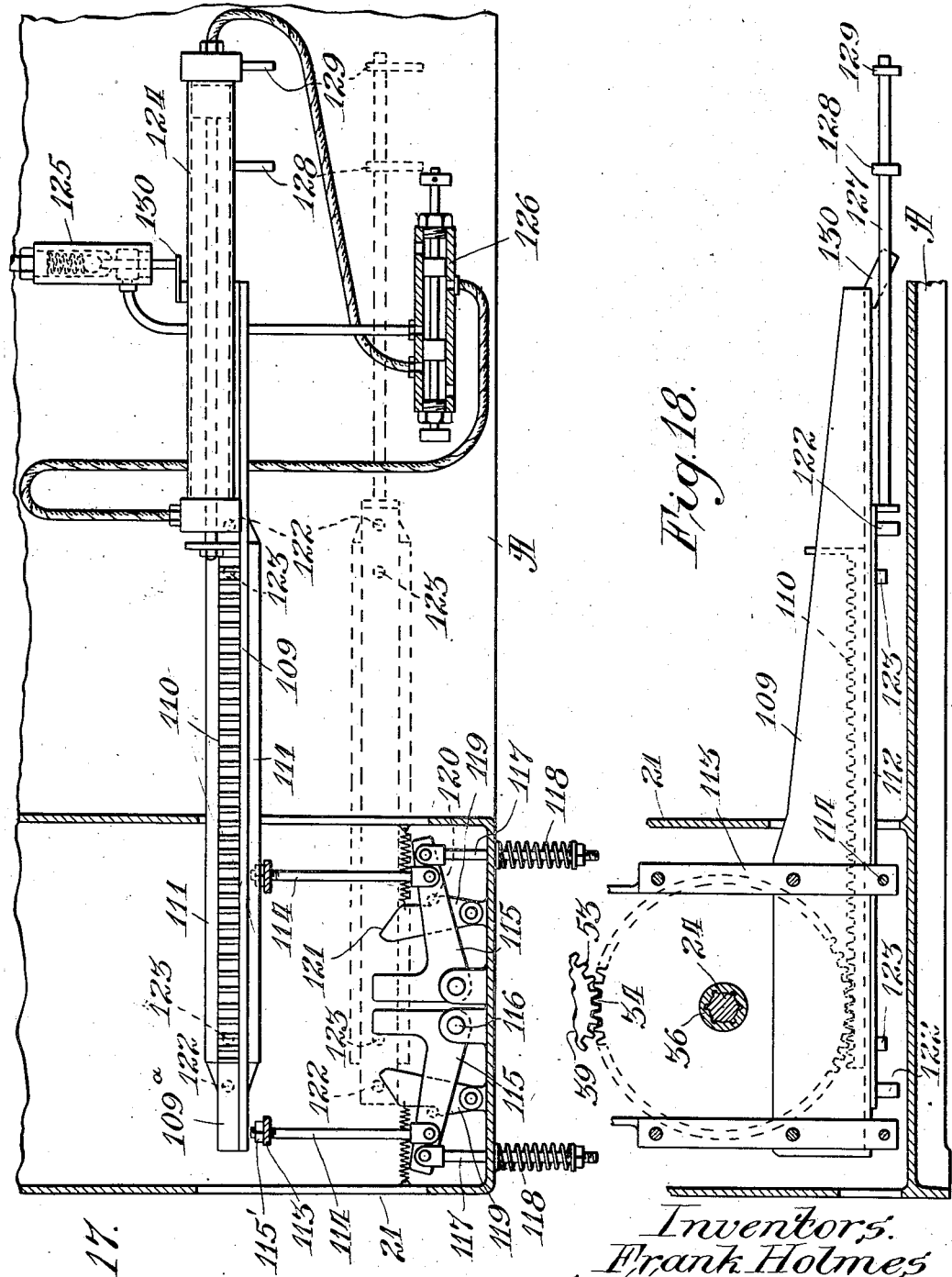

Patented Mar. 19, 1935

1,994,951

UNITED STATES PATENT OFFICE 1,994,951

SAUSAGE STUFFING AND LINKING MACHINE

Frank Holmes, Chicago, Ill., and Albert Balkema, Laurium, Mich., said Balkema assignor to said Holmes Application November 23, 1932, Serial No. 644,030

17 Claims. (Cl. 17—35)

This invention relates to sausage making machines, and its main object is to provide improved apparatus for stuffing or filling a sausage casing and for forming the same into links while utilizing variations in the capacity of the casing at different parts of its length, so that sausage links of differing meat content may be produced according to the variations in diameter, or capacity, of the casing when distended and the maximum capacity of the entire casing be made available, with resulting economy in the quantity of casings needed for a given amount of meat.

Another important object of the invention is to provide apparatus which will act to prevent rupture and tearing of the casing during the stuffing and crimping operations by variably restricting the possible degree of distention of the casing to within its normal limits of elasticity at all parts of its length.

The foregoing objects, as well as other objects and advantages that will become obvious to those skilled in the art as the invention is disclosed, are attained by providing apparatus which will operate quickly and efficiently to form a series of sausage links embodying means, such as a mold or die, for containing the casing while being stuffed, means for crimping or tying the stuffed casing to form successive links, means for rotating or twirling the successive links during the crimping process, and means for calibrating or measuring the capacity of the casing and for automatically adjusting the die or mold to the indicated capacity.

The mechanism which is hereinafter described constitutes one possible embodiment of the invention and is illustrated by the accompanying drawings, where:

Figure 2 is a side elevation, viewed from the right hand side of Figure 1;

Figure 3 is an enlarged scale, longitudinal, vertical section through the sausage forming mechanism, taken on the line 3—3 of Figure 1

Figure 4 is an end elevation of the mechanism seen in Figure 3 viewed from the right, certain lower parts being sectioned to reveal internal structure and the positions of other internal parts being indicated in broken lines;

Figure 5 is a detail view of the upper part of Figure 4 with certain parts in different positions;

Figure 8 is a vertical section on the line 8—8 of Figure 6;

Figure 9 is a detail sectional view on the line 9—9 of Figure 5;

Figure 10 is a vertical section on the line 10—10 of Figure 9;

Figure 11 is a diagrammatic view of the relay circuit controlling automatic adjustment of the die sections;

Figures 12 and 13 are detail views of the cam-controlled sausage gripping plate and related parts;

Figures 14 and 15 are detail side and plan views, respectively, of a cam actuated track plate seen in Figures 12 and 13;

Figure 16 is another view of the rotary die head shown on Figure 6, showing the position of the head when the molding dies are closed;

Figure 17 is a detail plan view of mechanism for controlling rotation of the die head in opposite directions alternately; and, Figure 18 is a side view thereof.

Figure 1:
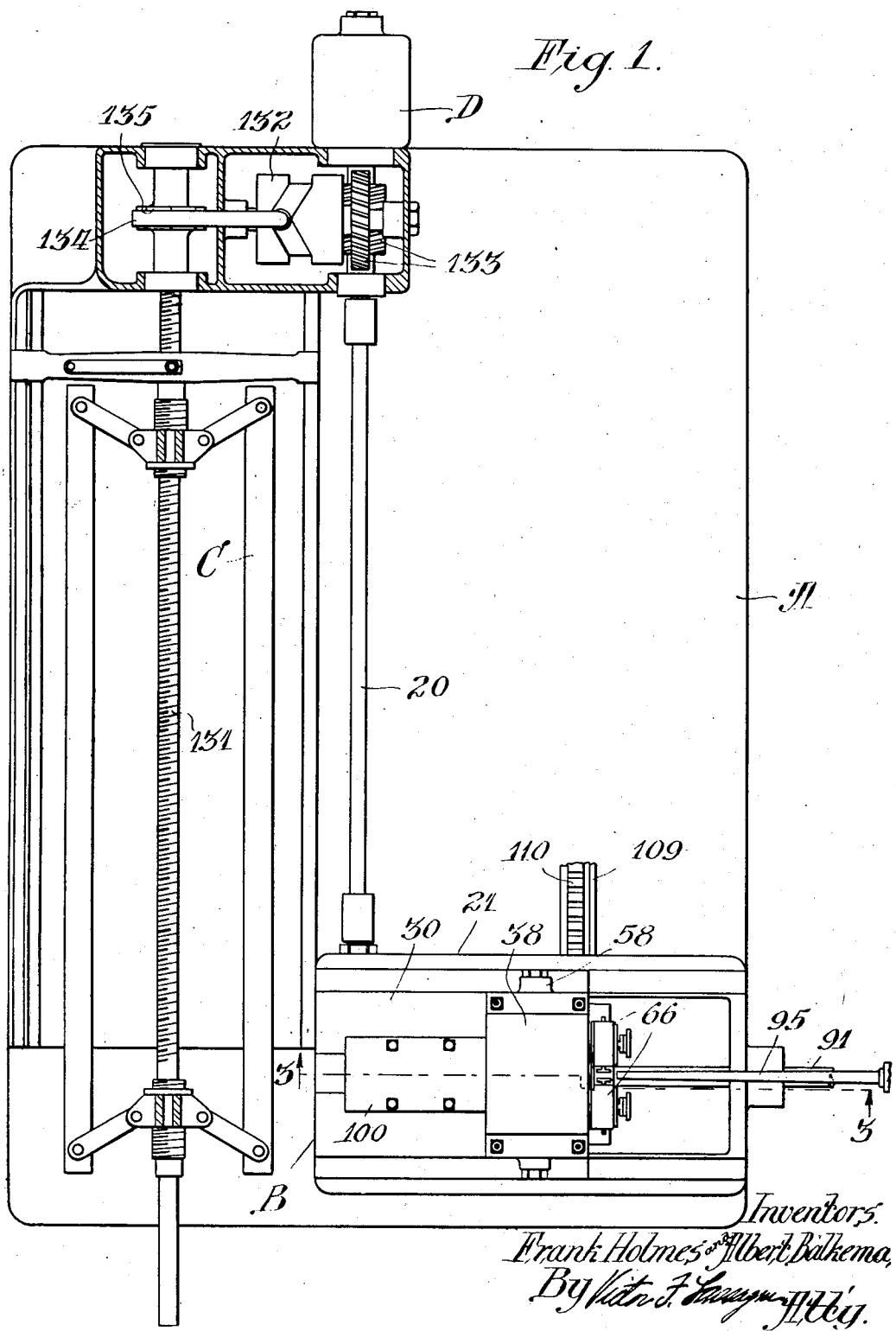
Figure 1 is a plan view of the entire machine.

As illustrated by Figure 1, the sausage forming and linking machine as a whole comprises a suitable base A on which there are mounted the forming and linking mechanism B, in which the present invention largely resides, the reel C for receiving the sausage links, and the driving element or electric motor D from which both the sausage forming and linking mechanism and the reel are driven in synchronism.

The forming and linking mechanism is located at one end of the base A and positioned in angular relation to the reel, as shown by Figure 1, and is driven from the motor D located at the opposite end of the base, by a drive shaft 20 which has its driving end suitably journaled in the side walls of an upright housing 21 containing the driving mechanism for the forming and linking mechanism. Within this housing the shaft 20 carries a worm pinion 22 (Figure 3) in mesh with a worm gear 23 fixed on one end of a shaft 24 extending longitudinally of the housing and journaled in suitable bearings located in its opposite end walls and in an intermediate bearing, within the housing at 25. Between the gear 23 and the bearing 25, the shaft 24 has secured to it a cam drum 26 formed with a cam track or groove 27 in engagement with a follower roller 28 mounted on the lower end of a stud bolt 29 held in a suitable boss formed in the base plate of a reciprocating carriage 30 slidably supported on rails 31 formed on the upper edges of the side walls of the housing 21. This carriage supports the sausage forming and linking device to be described.

Figure 7:
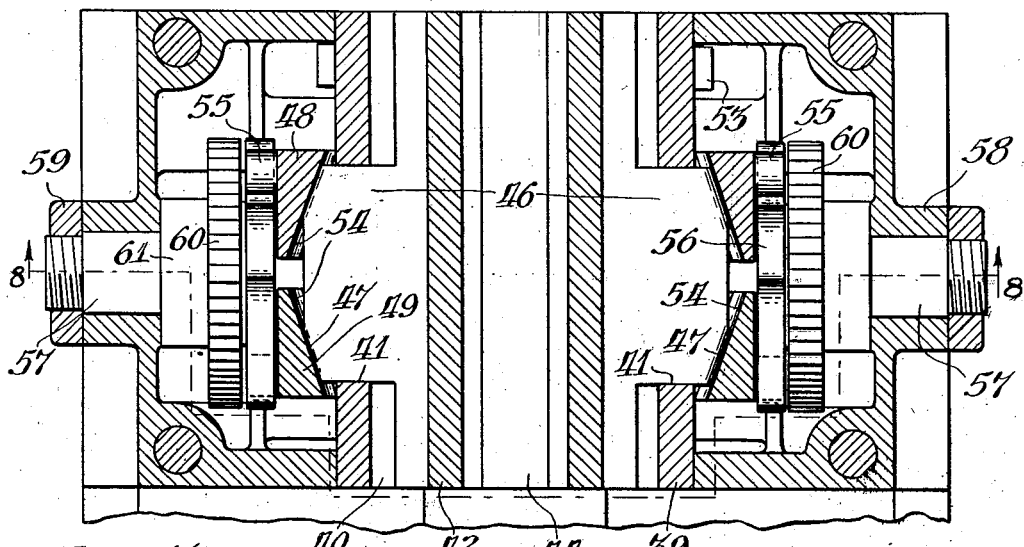
Figure 7 is a horizontal section on the line 7—7 of Figure 6

That portion of shaft 24 between the intermediate bearing 25 and the end wall is splined or otherwise formed, as at 32, to slidably, but non-rotatably, support certain driving elements which are related to the mechanisms on the carriage 30 and reciprocate therewith. These are contained within a housing 33, open at the bottom, and secured to and depending from the carriage 30, and consist of a gear 34 and a cam disk 35. The cam 35 is secured on a sleeve 36 grooved to fit the splined portion 32 of the drive shaft, and cam 35 may have a laterally extended hub 37 which is secured on the sleeve 36 in a manner to allow angular adjustment for proper timing. The gear 34 is rotatably mounted on the sleeve 36 in any suitable manner and in the present instance is shown as mounted between the end of the cam hub 37 and a corresponding abutment on the wall of housing 33. The cam 35 and gear 34 are in operating relation to the forming elements on the carriage proper, which will be described. The principal element of the sausage forming mechanism is a rotary head 39 journaled in a casing 38 which is open at the ends to expose the ends of the rotary head, in which head the relatively movable sections of a sausage forming die are housed. The rotary head 39 is formed with a cylindrical outer surface and is cored to provide a generally oblong, rectangular chamber 40 extending from end to end of the head with parallel side walls joined by end walls which preferably converge outwardly to longitudinally extending slots formed in the rotary head 39 at 41 (Figure 7). The chamber or cavity in the cylindrical rotary head 39 contains a sausage molding die 42 which extends from end to end of the head and is made up of two mating sections, or blocks, respectively tongue or grooved longitudinally, as at 43 (Figure 6), to provide for relative movement of the sections towards and from one another to vary the capacity or size of the sausage-forming space 44 in the dies. The sides of the die sections are in contact with the side walls of the chamber in the rotary head and are slidable thereon towards and from the end walls towards which they are impelled by a set of four coil springs 45 housed in aligned bores in the two die sections. In order to govern the expansion and contraction of the die sections, each section carries a fixed key or tongue 46. These keys project through the slots 41 in the rotary head and are movable radially therethrough. The opposite ends of the projecting portions of the keys 46 are inclined or beveled as at 47 (Figure 7), and these ends engage and ride on the inner inclined surfaces of opposed circular guide shoes 48 and 49, which surround the rotary head 39. These shoes are formed with upper and lower radial lugs, as at 50, shaped to conform to slide-ways formed in the casing 38, as best seen on Figure 6. These guide shoes are loosely connected by headed pins 51 passing through bores in the arms 50, wherein are seated coil springs 52 (Figure 8), which tend to move the shoes towards each other. The relation of the opposite inclined inner surfaces of the shoes to the projecting keys 46 on the die sections is, therefore, such that movement of the shoes away from or towards each other must cause corresponding movement of the die sections to increase or decrease the die opening 44. The rotary head 39 is provided with a fixed gear ring 53, at one end adapted to mesh with the teeth on the gear 34 and is rotated periodically thereby in opposite directions alternately, as will be later described. It is necessary that the die 42 be allowed to spread when a cycle of rotation of the head 39 is completed, so as to release the sausage contained in the die opening 44, and to effect this the inner faces of the shoes 48 and 49 are each formed with diametrically opposed seats or grooves at 54 designed to receive the keys 46 at a certain time in the rotation of the head 39. Therefore, the die 42 is contracted, or in sausage molding position, when the keys 46 are on the surfaces of the guide shoes 48 and 49, as in Figure 16, and the die is spaced, or in sausage releasing position, when the keys 46 are seated in the grooves 54, as in Figure 6, but the capacity of the die, when contracted, can be changed by adjustment of shoes 48, 49.

Figure 6:
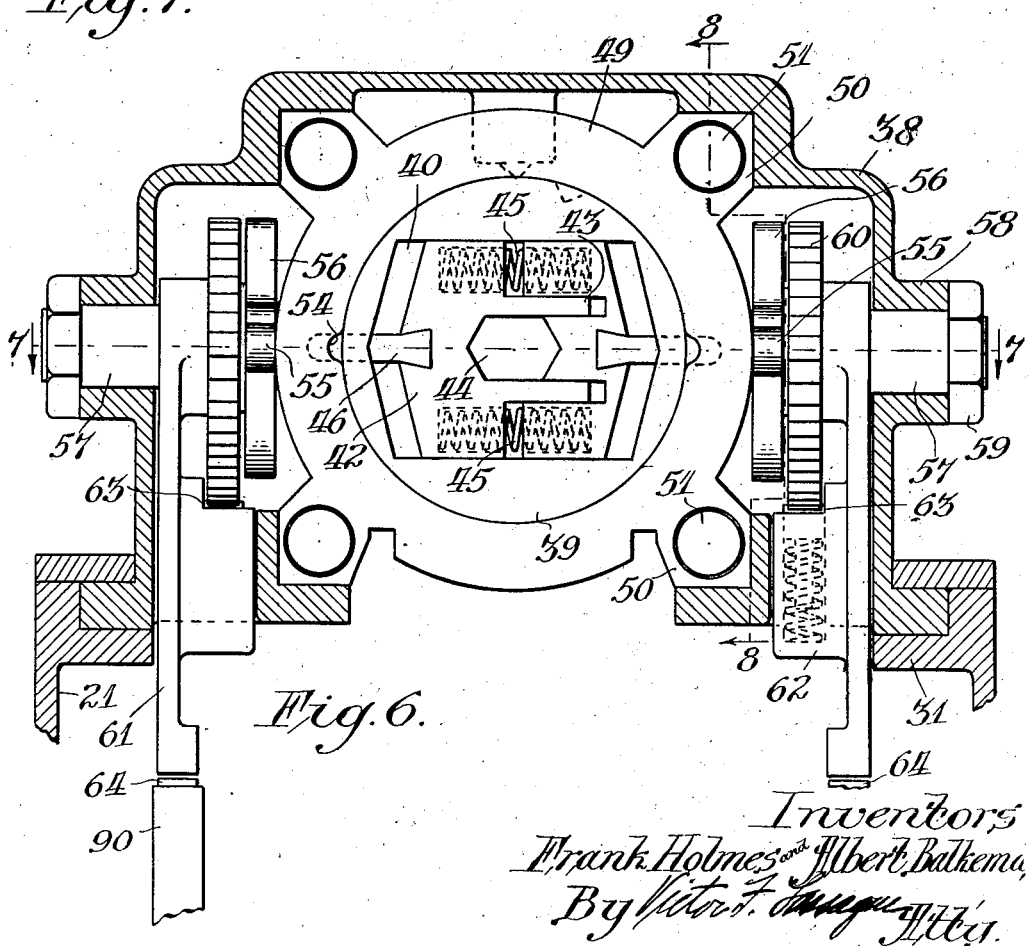
Figure 6 is an enlarged, vertical section through the mold containing casing on the line 6—6 of Figure 3, showing one end of the rotary die head.

Adjustment of the guide shoes 48 and 49 towards and from one another to vary the size of the die opening 44 is effected by providing the two outer sides of each shoe with opposite horizontal pintles 55 (Figures 6, 7 and 8). These pintles, at both sides of the shoes, are in engagement with the opposite radial arms of star cams 56 rotatably mounted on the inner ends of stub shafts 57 journaled in bosses 58 formed in the sides of the casing 38 and held in position by nuts 59. Immediately back of the cams 56 and fixed thereto for joint rotation therewith, are ratchet gears 60. Between these ratchet gears and the inner walls of the casing, the stub shafts 57 carry depending levers 61, free to swing on the stub shafts and provided with integral boxes 62 (Figure 6) on their inner sides located immediately under the ratchet gears 60. The boxes 62 are formed with vertical sockets for spring pressed ratchet pawls 63 in engagement with the teeth of the ratchet gears 60. Thus, rocking of the levers 61 towards the right (Figure 8) will impart a limited predetermined degree of angular movement to the ratchet gear 60 and star cam 56. As the pintles 55 ride on the arcuate surfaces 56$^a$ of the cam arms from base to apex by successive steps as actuation of the levers 61 occurs, the pintles 55, and with them the shoes 48 and 49, will be forced apart to corresponding degrees until the limit of this movement is reached. This happens when the pintles have reached the apices of the cam arms, as shown on Figure 8, and when this stage is reached, the next actuation of the cam 56 will drop the pintles to the bases of the second pair of cam arms, due to the spring pressure on the shoes 48, 49. As the shoes are moved apart by the cams, as just described, the sections of the die 42 will be allowed more space, owing to the fact that the keys 46 ride on the inclined faces of the shoes and move radially with the die sections as the horizontal position of the shoes is varied. The casing 38 and mechanism housed therein are all parts of the reciprocated carriage that carries the sausage molding and linking means. The levers 61 are, therefore, carried back and forth as the carriage is reciprocated and there are trips 64 suitably mounted in the base of the machine in position to be engaged by the ends of the levers under certain conditions to be later described. When so engaged and swung, the levers will contact with spring pressed abutments 65 (Figure 8) mounted on the reciprocating head, which will act to return the levers to vertical position. The trips 64 are normally not in position to engage the levers 61, but are moved to such positions automatically when the size of the die is to be made larger as determined by certain calibrating mechanism, now to be described, that forms part of the sausage molding and linking mechanism on the reciprocating carriage.

The mechanism for governing the trips 64 and thereby the caliber of the die opening 44 is preferably electrical and includes any suitable circuit closing elements which will act in conjunction with sausage crimping plungers and sausage calibrating feeler bars located on the carriage at the outer end of the casing 38, as best seen on Figure 4. These parts are mounted in twin boxes or housings 66 supported on runner blocks 67 slidable on a transverse track or slide-way 68 slotted to provide communication with the interior of the depending housing 33 (Figures 3 and 4). The respective runner blocks 67 are formed with cup-like seats 69 on the under sides which engage heads on the upright arms of bell-crank levers 70 pivoted at 71 to fixed parts of the housing 33. The other arms of the levers 70 carry offset rollers 72 which engage similar cam tracks 73 formed on the opposite faces of the cam disk 35 heretofore referred to. As this cam rotates, the levers 70 will be swung in a manner to cause transverse reciprocation of the runner blocks 67 and parts carried thereby towards and from each other periodically, as shown by Figures 4 and 5. Each of the boxes 66 carries an inwardly projecting sausage crimping plunger or blade 74 having V-shaped outer ends, which are positioned to contact and overlap when the boxes are in the position of Figure 5. The extent of the overlap is gauged to leave an opening, as at 75, which is in alignment with the axis of the sausage molding die in the rotary head 39. Outwardly of the plungers 74 and in parallel relation thereto, the boxes 66 have mounted therein the transversely extending feeler bars 76 which are axially movable in the boxes and have arcuate feeler heads 77 facing each other. As best seen on Figures 9 and 10, each feeler bar is provided with rack teeth 78 on its lower edge in mesh with a small pinion 79 fixed on a stub shaft 80 also carrying the larger pinion 81. The larger pinion is in mesh with a smaller pinion 82 fixed on a shaft 83 which projects from the outer face of the box 66 where it has fixed to it a finger wheel or button 84 on which there is an upwardly extending indicator arm 85, the end of which travels over a scale at 86, which indicates the distance between the faces of the feeler heads 77, preferably in millimeters. Within each box 66, each shaft has secured to it an upwardly extending contact arm 87, which has a contact head positioned to engage the units of an arcuately arranged series of contact blocks 88. The arms 87 and blocks 88 are the make and break elements of an electric circuit, diagrammatically shown by Figure 11, through which the trips 64 in the paths of the levers 61 are actuated. The circuit may be, for example, of the delayed relay type and is arranged to energize solenoids, or motor magnets, 90, by which the trips are projected into contacting position with the levers 61. When the movable arms 87 pass over one of the contact blocks 88, they close the circuit to a slow-to-operate relay A' (Figure 11) and to the solenoids 90 in parallel. This causes the trips 64 to be projected. When relay A' operates, it closes the circuit to relay B', which is also slow-to-operate. When relay B' operates, it opens the circuit to the solenoids 90, permitting the trip pins 64 to drop to normal position. When the contact arms 87 move off the contact blocks, the relays will restore to normal and are ready for another operation when the contact arms reach the next block. The two delayed relays, operating in succession, will provide a period during which the trips are effective, under proper timing, to cause the levers 61 to be actuated and the caliber of the sausage die increased, if and when the feeder bars 76 are moved to cause the arms 85 to pass over a contact block in the respective series. The purpose and manner of operation of the calibrating or feeler members 76 will be further described in connection with the operation of the machine.

Referring now to Figure 3, it is seen that the drive shaft 24 extends beyond the base housing 21, as at 91, and has its end journaled in a bearing at 92 which may be on the wall of a container 93 for sausage meat under pressure. This container has an outlet at 94 for discharge of the meat and this connects with an elongated horn or nozzle 95 which is normally in alignment with the sausage molding die in the rotary head 39. It is connected to the container by a ball and socket joint at 96 to permit the horn to be moved to convenient position for placing a length of sausage casing thereon. As meat is to be fed to the die in a predetermined amount at each actuation, the outlet 94 is controlled by a suitable knife valve at 97, which has a depending shank carrying a cam roller 98 engaged in a cam track in the face of a cam disk 99 secured to the drive shaft extension 91. This cam control of the valve 97 will be adjusted to allow the desired amount of meat to be forced from the horn 95 in properly timed relation to the operation of the sausage forming mechanism.

During the sausage forming and delivering operations it is necessary that sausage links successively formed be temporarily held against movement and, for this purpose, the reciprocating carriage 30 carries a vertically movable clamping or holding plate 100. This plate is preferably of oblong rectangular shape and lies above the bed plate or table 101, which receives the formed sausages from the die in the rotary head 39. The clamp plate 100 has four depending legs 102 (Figures 12 and 13), which pass downwardly through slide openings in the table plate 101 and through the cover plate of the casing 21, where the ends of the legs carry rollers 103 riding on trackways formed on the upper side of a vertically movable, but horizontally stationary, cam actuated table 104. The clamp plate is held in lowermost position by coil springs 105 surrounding the legs 102 of the clamp plate and confined between the bottom of the bed plate 101 and suitable abutments on the legs. The table 104 is formed with depending cam engaging arms 106 in engagement with cams 107 fixed on shaft 24 and with a guide arm 108 which engages parts within the housing 21 and acts to resist horizontal movement of the table plate. This structure provides for timed vertical movement of the sausage holding clamp plate 100.

In order to effect proper crimping of the casing between links, the die carrying head 39 is given a one complete rotation alternately in opposite directions, which cycles of rotation are interrupted or divided into one long and one short period of movement imparted to the head at certain stages of its reciprocation by mechanism which will next be described. As above explained, the gear 34 is in constant mesh with the gear ring 53 on the rotary head and reciprocates therewith as the carriage 30 is moved back and forth by the cam drum 26, carrying with it the housing 33 and the sleeve 36, which slides on the splined portion 32 of the drive shaft. Also moving with the depending housing 33 and carried thereby on its lower end is a supporting bracket 109 formed to provide a transverse slide-way for a rack 110, which is in mesh with the gear 34. The rack 110 is held in position on the slideway, which has a lower horizontal flange 109a, as by side bars 111 and a base plate 112 (Figure 3) secured to each other and embracing the flange 109a, as shown. The slide bracket 109 extends beyond one side of the housing 21 and suitable openings are provided in the opposite sides of the housing for the bracket and for movement of the rack 110. That portion of the bracket 109 which is within the housing has fixed to it a pair of spaced hanger bars 113. The lower ends of these bars are apertured to slidably receive lever setting rods 114 which have stop nuts 115' on their free ends in position to be engaged by the inner sides of the hanger arms 113. The other ends of the rods 114 are pivotally connected, respectively, to the longer arms of horizontally disposed bell-crank levers 115 pivoted on vertical pivots within the casing 21, as at 116. Each lever 115 has its longer arm pivotally connected to a spring actuated pull rod 117 extending through a wall of the casing and carrying a compression spring 118 in the manner shown by Figure 17. The spring-actuated pull rod on each lever tends to move the longer arm towards the wall of the casing, thereby moving the shorter arm in the direction of movement of the rack 110. To hold each lever against the action of the pull rods 117, there are provided latching pawls 119, each formed with a shoulder for engaging a pin 120 on the under side of each lever. These pawls are formed with inclined ends or surfaces at 121, which are respectively adapted to be engaged by a depending pintle 122 on opposite ends of the base plate 112 of the slidable rack 110 when the carriage 30 arrives at its extreme of reciprocating movement outwardly. At this time, a shorter pintle 123, adjacent the longer pintle 122, will be in contact with the shorter arm of a lever 115. The action of the parts so far described is as follows: Starting with the parts as in Figure 17, the carriage begins its outward movement, the slide moving with it and the hanger arms 113 sliding along the setting rods 114. As the slide bracket reaches the dotted line position in Figure 17, pintle 122 on the rack 110 contacts a pawl 119 and releases a lever 115 which is immediately swung outwardly. As pintle 123 is in contact with the short arm of the lever, the rack 110 is moved a short distance to the left, imparting a small angle of rotation, about 10 degrees, to the gear 34 and rotary head 39. The carriage and bracket then move back and, as the full line position of Figure 17 is reached, the nut 115' on the rod connected to the lever just under operation is contacted by the hanger arm 113 and the lever 115 restored to latched position. The same action will take place to give the rack a slight movement in the opposite direction by the second lever when the next reciprocation of the carriage occurs with the rack at the opposite end of its movement. This slight movement imparted to the rack serves to close the die just previous to the stuffing operation, as will be more fully explained.

In order to give the rack its remaining throw, or amplitude of movement alternately in opposite directions, a compressed air cylinder and controls therefor may be employed. In the present instance, this is shown as comprising a cylinder 124 mounted on an extended end of the bracket 109 and supplied from an outlet valve 125 through a reverse flow valve 126, which has flexible tube connections with the opposite sides of the piston in cylinder 124, as illustrated. The supply valve 125 and reverse valve 126 are mounted in fixed position and are actuated by movements of the supporting bracket 109 and rack 110, as follows: The base plate 112 of the rack has secured to it an extension bar or rod 127 provided near its outer end with spaced, laterally extending, contact lugs or arms 128 and 129. The piston rod of the reverse flow valve projects from the cylinder at each end and carries contact heads adapted to be engaged by the arms 128 and 129, respectively. The extended end of the bracket 109 carries a trip arm 130 positioned to engage the projecting stem of the supply valve 125 as the carriage and bracket arrive at the end of their travel backward. The rack is reciprocated as follows:

In Figure 17, the rack has just reached its extreme of movement towards the right, and the carriage then begins its outward movement. When the carriage reaches the end of its outward movement, the supporting bracket 109 and the rack 110 are in dotted line position and lug 128 is in contact with a head at one end of the reverse flow valve piston rod. Release of a lever 115 and the minor movement of rack 110 towards the left then occurs, as above described, and this movement causes the piston heads in valve 126 to be moved sufficiently to reverse the flow therethrough. The carriage then begins its return movement at the termination of which the contact arm 130 engages the stem of supply valve 125, opening same and causing flow through valve 126 to the opposite side of cylinder 124, thereby moving rack 110 its full distance towards the left and correspondingly rotating the gear 34 and head 35. At the next reciprocation of the carriage, with the rack then at its other extreme of movement from that illustrated, the contact lug 129 will be in contact with the head at the opposite end of valve 126 and the operation described will be reversed and the rack moved back to the position illustrated as the carriage terminates its rearward movement.

The reel C for receiving the string of sausage links is periodically rotated in timed relation to the movements of the sausage forming mechanism and is gradually moved axially along a screw shaft 131, as common with receiving reels for various materials. The periodic, timed rotation of the reel is preferably effected by a cam cylinder 132 driven from the shaft 20 through worm gears 133 and acting to reciprocate a ratchet bar 134 in mesh with a ratchet gear 135 on the reel shaft 131.

The operation of the machine involves both reciprocation and rotation of the head 39 and the parts co-operating therewith, and is substantially as follows:

Starting with the mechanism in the position of Figure 3, which shows the parts as they are, just as a sausage has been formed, it will be seen that the length of casing coming off the horn 95 includes a short portion at E lying between the rotary head 39 and the end of the horn 95, which is expanded by an excess of meat ejected from the horn. This short length of casing lies between the feeler heads 76 and its expansion is not restricted by the size of the die opening, as is that part of the casing contained within the die or mold. This slight excess feed of sausage meat is provided for in order to test the casing as to capacity and to take advantage of any increase in its capacity or diameter as that occurs in the length of the casing. Assume that the machine has been started with the feelers 76 at their innermost setting, with the pointers 85 on the lower end of the scale. The die 42 will then be at its contracted or smallest size. If the filled casing at E is of materially greater diameter than the sausage previously formed, the feelers 76 which contacted this section of the casing as the carriage completed its backward or return movement, will have closed the electric circuit controlling the trips 64 and the die control levers will have been actuated to enlarge the diameter of the die one step, or 2 millimeters. As the carriage 30 arrives at the position of Figure 3, there is a pause in its reciprocatory movement while the roller 28 is traveling in a straight, circumferential part of the track 27 on the cam drum 26. At the beginning of this pause, the gear 34, in engagement with the gear 53 on the rotary head, moves the head through substantially 350 degrees from the position of Figure 16 to that of Figure 6, thus opening the die as the keys 46 drop into the grooves 54 and releasing the contained sausage. This rotation of the die twists the sausage casing at each end of the die and "links" the sausages, one twist, or rotation, being given the casing where it has just been crimped by the plungers 74, and the second twist being given at the other end of the sausage in the die upon reverse rotation of the head at the next actuation. As the die opens, the sausage-holding plate 100 is lifted and the carriage moves forward until the rotary head has telescoped the horn 95 and the portion E of filled casing is at the far end of the die. As the carriage reaches its limit of forward travel, a lever 115 is released and gear 34 rotates the head substantially 10 degrees, thereby causing the keys 46 to ride out of the grooves in the guide shoes 48, 49 to the position of Figure 16 and closing the die. The valve 97 then opens and sausage meat flows from the horn as the carriage moves back to starting position, thus stuffing that portion of the casing contained within the die progressively from end to end and obviating the formation of an air pocket at the distal end of the sausage, as occurs if stuffing of a length of casing is attempted, without progressive withdrawal of the horn as stuffing takes place. The valve 97 closes just as the carriage reaches the position of Figure 3, but the closing is gauged to provide a slight excess of meat to be ejected, thus filling the short length of casing outside the die, as at E. As the flow of meat stops and rotation of the head 39 is about to start, the cam 35 moves the boxes 66 to the position of Figure 5, thereby crimping the end of the newly formed sausage, as seen in Figure 3. At this time, the feeler heads 77 also approach the portion E of filled casing, as before stated. If the capacity of the casing has become greater, the portion E will be of substantially greater diameter than the sausage just formed, the feelers will, therefore, be pushed back, causing rotation of the shafts 83 and forcing the heads on contact arms 87 over one of the contact blocks 88 with simultaneous movement of the indicator arms 85. This causes the trips 64 to be projected at the instant that the carriage begins its forward movement, at which time the levers 61 are actuated, and the shoes 48, 49 thereby forced apart one step, correspondingly increasing the capacity of the die when next moved by the rack 110 to its sausage forming or closed position. As herein shown, the die capacity may be increased to a limit of eight millimeters in steps of two millimeters, but this disclosure is merely illustrative. When the pintles have reached the apices of the cam arms (Figure 8), the next actuation drops them to the lower portions of the next pair of cam arms, returning the die to its minimum capacity setting. As the automatic action of the feeler heads is only towards increase of size, the indicators 85 are then turned to the lower end of the scale by use of the finger pieces 84, and the automatic adjustment of the die capacity is resumed. Obviously, if a fixed die capacity is desired, the circuit controlling automatic operation can be broken by a suitable switch.

As the carriage moves back to the position of Figure 3, the reel C is rotated through a distance substantially equal to that traveled by the carriage and previously formed sausage is received on the reel.

From the foregoing description, it will be clear that the invention herein disclosed provides a sausage forming and linking machine employing a principle of operation that involves use of a revoluble and reciprocable sausage forming die in connection with means for varying the capacity of the die as permitted by the capacity of the casing being stuffed and that, due to the novel principle of operation employed, the sausage casing will be rapidly and uniformly filled to capacity and the successive links formed in a die that prevents bursting or tearing of the casing. The organization, details of construction, and parts herein illustrated and described represent a preferred embodiment of the invention, but these may be varied without departure from the scope of the invention as set forth in the following claims.

What is claimed as new is:

1. A sausage making machine comprising the combination of a sausage molding die having an open end, a meat supplying horn at said end in axial alignment with the die and adapted to telescope therewith, and means for causing the die and horn to telescope one another intermittently during operation of the machine.

2. A sausage making machine comprising the combination of a sausage molding die having an open end, a meat supplying horn at said end in axial alignment with the die and adapted to telescope therewith, means for controlling the flow of meat from the horn, means for causing the die and horn to telescope one another intermittently during operation of the machine, and means for actuating the controlling means for the meat flow in timed relation to the relative movement between the die and horn.

3. In a sausage making machine, the combination of a reciprocably mounted sausage molding die, means for intermittently reciprocating the die axially, means for introducing a sausage casing into the die during its movement in one direction, and means for stuffing said casing during movement of the die in the opposite direction.

4. In a sausage making machine, the combination of a reciprocably mounted sausage molding die, means for intermittently reciprocating the die axially, means for introducing a sausage casing into the die during its movement in one direction, said means including a meat supplying horn within the casing which is telescoped by the die during said movement, and means for causing a flow of meat from said horn during reverse movement of the die to progressively stuff the casing contained within the die as same withdraws from the horn.

5. In a sausage making machine, the combination of a rotatably mounted sausage molding die, intermittently actuated means for causing a length of sausage casing to be introduced axially into the die, means for stuffing that portion of the casing contained in the die, means for crimping the end of said stuffed portion, and means for then rotating the die on its longitudinal axis to link the contained sausage.

6. In a sausage making machine, the combination of a rotatable sausage molding die composed of sections relatively movable radially to open and close the die, intermittently actuated means for causing a length of sausage casing to be introduced axially into the die, means for stuffing that portion of the casing contained in the die, means for then imparting a cycle of rotation to the die on its longitudinal axis to link the contained sausage, and means actuated by rotation of the die for closing it before stuffing occurs and for opening it after linking is completed.

7. In a sausage making machine, the combination of a sausage molding die composed of sections relatively movable radially to vary the capacity of the die, intermittently actuated means for causing a sausage casing to be introduced axially into the die in successive portions of predetermined length, means for stuffing the successive lengths of casing after introduction into the die and for simultaneously stuffing a portion of the casing outside the die, means for gauging the diameter of that portion of the stuffed casing outside the die, and means for increasing the capacity of the die as the diameter of said stuffed casing increases.

8. In a sausage making machine, the combination of a reciprocably mounted carriage, a sausage molding die on the carriage composed of sections relatively movable radially to vary the capacity of the die, means for intermittently reciprocating the carriage in the axial direction of the die, means for introducing a sausage casing into the die in successive portions of predetermined length at each movement of the carriage in one direction, means for stuffing the casing within the die at each movement of the carriage in the other direction and for simultaneously stuffing a portion of the casing outside the die, means for gauging the diameter of that portion of the stuffed casing outside the die, and means actuated by movement of the carriage for increasing the capacity of the die as the diameter of the stuffed casing increases.

9. In a sausage making machine, the combination of a reciprocably mounted carriage, a sausage molding die on the carriage composed of radially movable sections, a meat supplying horn positioned in alignment with the axis of the die and in the path of movement thereof, said horn serving to carry a sausage casing, means for intermittently reciprocating the carriage to move the die into and out of telescoping relation with the horn, means for stuffing a predetermined portion of casing as the carriage moves back from the horn, means for crimping each sausage after said stuffing operation has occurred, and means for expanding the die sections after each reciprocation of the carriage.

10. In a sausage making machine, the combination of a reciprocably mounted carriage, a sausage molding die on the carriage composed of sections which are relatively movable to open and close the die, means for intermittently reciprocating the carriage, means for introducing and stuffing a predetermined length of sausage casing within the die at each reciprocation of the carriage, means on the carriage for crimping each length after said stuffing operation, means for opening and closing the die in timed relation to the movements of the carriage, and means for withdrawing a predetermined length of the formed sausage chain from the carriage after each reciprocation thereof.

11. In a sausage making machine, the combination of a reciprocably mounted carriage, a sausage molding die on the carriage composed of sections which are relatively movable to open and close the die, means for intermittently reciprocating the carriage, means for introducing and stuffing a predetermined length of sausage casing within the die at each reciprocation of the carriage, means on the carriage for crimping each length after said stuffing operation, means for opening and closing the die in timed relation to the movements of the carriage, means on the carriage for grasping successive sausage links as the carriage moves in one direction, a reel for receiving the chain of sausages, and means for imparting a predetermined degree of angular movement to the reel as the carriage moves in the other direction.

12. In a sausage making machine, a reciprocably mounted carriage, a sausage molding die on the carriage comprising opposite sections mounted for relative movement radially, means for intermittently reciprocating the carriage, means acting in timed relation to the reciprocation of the carriage for causing relative movement of the die sections through a fixed range to open and contract the die, and means actuated by reciprocation of the carriage for progressively increasing the diameter of the opening in the die at each successive completed contraction.

13. In a sausage making machine, a reciprocably mounted carriage, a rotary head mounted on the carriage, a sausage molding die in the head comprising opposite sections relatively movable radially in the head, means for intermittently rotating the head, means actuated by rotary movement of the head for causing relative movement of the die sections through a fixed range to open and contract the die, means for reciprocating the carriage, and means actuated by reciprocating movement of the carriage for progressively increasing the diameter of the opening in the die at each successive completed contraction.

14. In a sausage making machine, a sausage molding die of variable capacity, means for progressively feeding a sausage casing axially through said die and stuffing the casing as it is moved through the die, and means for increasing the capacity of the die when the capacity of the casing being fed thereto increases comprising calibrating means periodically moved into contact with a stuffed section of the casing, and electrically actuated means, controlled by said calibrating means, for expanding the die.

15. In a sausage making machine, the combination of a rotatably mounted sausage molding die, means for causing a sausage casing to be passed through the die axially by intermittent movement, means for successively stuffing the portions of the casing received within the die, and means for intermittently rotating the die through predetermined arcs in opposite directions alternately after each stuffing of the contained portion of casing and in timed relation with the movements of the casing through the die, whereby the casing is twisted between the stuffed portions to form links.

16. In a sausage making machine, the combination of a rotatably mounted sausage molding die composed of radially movable sections, means for alternately opening and contracting the die by moving said sections at predetermined intervals, means for causing a sausage casing to be passed through the die axially during each opening of the die in successive portions of equal length, means for successively stuffing the portions of the casing received within the die, and means for intermittently rotating the die through predetermined arcs in opposite directions alternately while the die is contracted whereby the casing is twisted between the stuffed portions to form links.

17. In a sausage making machine, the combination of a rotatably mounted sausage forming head comprising opposed sausage engaging members movably radially of the head and affording an axial opening, means for alternately expanding and contracting said members, means for causing a sausage casing to be passed through the head axially between said movable members by intermittent movement, means for discharging a predetermined quantity of meat in the position of the casing in the head, and means for rotating the head in timed relation with the movement of the casing through the head and with the movement of the sausage engaging members, whereby the stuffed section of casing is turned to form links while engaged by said members and during the interval between axial movements of the casing.

FRANK HOLMES.
ALBERT BALKEMA.